(12) United States Patent
Di Bartolomeo et al.

(10) Patent No.: US 12,283,799 B2
(45) Date of Patent: Apr. 22, 2025

(54) HIGH VOLTAGE OVERHEAD ELECTRIC TRANSMISSION LINE EQUIPPED WITH SWITCHGEAR UNIT

(71) Applicant: TERNA S.P.A., Rome (IT)

(72) Inventors: Evaristo Di Bartolomeo, Rome (IT); Dario Polinelli, Rome (IT); Roberto Spezie, Rome (IT)

(73) Assignee: TERNA S.P.A., Rome (IT)

( * ) Notice: Subject to any disclaimer, the term of this patent is extended or adjusted under 35 U.S.C. 154(b) by 0 days.

(21) Appl. No.: 17/768,913

(22) PCT Filed: Oct. 14, 2020

(86) PCT No.: PCT/IB2020/059647
§ 371 (c)(1),
(2) Date: Apr. 14, 2022

(87) PCT Pub. No.: WO2021/074812
PCT Pub. Date: Apr. 22, 2021

(65) Prior Publication Data
US 2024/0106208 A1 Mar. 28, 2024

(30) Foreign Application Priority Data
Oct. 15, 2019 (IT) .......................... 102019000018818

(51) Int. Cl.
*H02B 5/02* (2006.01)
*H02H 7/26* (2006.01)

(52) U.S. Cl.
CPC ................ *H02B 5/02* (2013.01); *H02H 7/26* (2013.01)

(58) Field of Classification Search
None
See application file for complete search history.

(56) References Cited

U.S. PATENT DOCUMENTS

| 4,379,957 A * | 4/1983 | Calvino | H02B 13/045 |
| | | | 218/55 |
| 5,515,230 A * | 5/1996 | Ashley | H02G 7/20 |
| | | | 361/107 |

(Continued)

FOREIGN PATENT DOCUMENTS

| JP | 2001069653 A | 3/2001 |
| RU | 2685237 C2 | 4/2019 |
| WO | 2019025840 A1 | 2/2019 |

OTHER PUBLICATIONS

International Search Report, issued in PCT/IB2020/059647, mailed Jan. 29, 2021, Rijswijk, NL.

*Primary Examiner* — Courtney L Smith
(74) *Attorney, Agent, or Firm* — ArentFox Schiff LLP; Michael Fainberg

(57) ABSTRACT

A high-voltage overhead electric transmission line extends from a first electrical substation to a second electrical substation and includes at least one "T" junction that forms a joint with three sections A first section and a second section allow connection between the first and the second electrical substations. A third section allows connection to the high-voltage overhead electric transmission line of a user or a third electrical substation or primary substation. The at least one "T" junction has a first switchgear unit configured to allow grid reconfigurations and installed on the first section, and a second switchgear unit configured to allow grid reconfigurations and installed on the second section. Each switchgear unit has a plurality of switchgear unit poles. Each switchgear unit pole is associated with a respective phase of the high-voltage overhead electric transmission line and has a line circuit breaker and at least one line disconnector.

17 Claims, 7 Drawing Sheets

(56) References Cited

U.S. PATENT DOCUMENTS

| | | | | |
|---|---|---|---|---|
| 6,411,067 | B1* | 6/2002 | Bjorklund | H02J 3/1814 |
| | | | | 363/35 |
| 6,630,638 | B1* | 10/2003 | Freeman | H02B 3/00 |
| | | | | 200/50.21 |
| 7,157,812 | B2* | 1/2007 | Couture | H02J 3/1814 |
| | | | | 307/112 |
| 7,310,220 | B2* | 12/2007 | Landert | H02B 5/06 |
| | | | | 361/605 |
| 7,639,460 | B2* | 12/2009 | Couture | H01H 33/666 |
| | | | | 361/2 |
| 7,675,386 | B2* | 3/2010 | Bumiller | H04B 3/56 |
| | | | | 333/131 |
| 10,880,362 | B2* | 12/2020 | Paruchuri | H04L 63/0272 |
| 10,916,922 | B2* | 2/2021 | Luoma | H01H 9/02 |
| 2004/0027791 | A1 | 2/2004 | Marmonier et al. | |
| 2013/0258724 | A1* | 10/2013 | Shen | H02J 3/381 |
| | | | | 363/35 |
| 2014/0125137 | A1* | 5/2014 | Couture | H02J 13/00034 |
| | | | | 307/98 |
| 2015/0008030 | A1 | 1/2015 | Couture | |
| 2022/0231488 | A1* | 7/2022 | Cameroni | H02B 5/02 |

* cited by examiner

HIGH VOLTAGE OVERHEAD ELECTRIC TRANSMISSION LINE EQUIPPED WITH SWITCHGEAR UNIT

CROSS-REFERENCE TO RELATED APPLICATIONS

This application is a National Phase Application of PCT International Application No. PCT/IB2020/059647, having an International Filing Date of Oct. 14, 2020 which claims priority to Italian Application No. 102019000018818 filed Oct. 15, 2019, each of which is hereby incorporated by reference in its entirety.

FIELD OF THE INVENTION

This invention relates, in general, to the sector of high-voltage electrical power transmission; in particular, the invention refers to a tower for a high-voltage overhead electric transmission line equipped with a switchgear unit.

BACKGROUND OF THE INVENTION

A high-voltage overhead electric transmission line, obtained according to the prior art, extends from a first electrical substation to a second electrical substation.

In these electrical substations, there are line circuit breakers arranged to interrupt the high-voltage overhead electric transmission line connected to them when they are opened. These circuit breakers may be opened as needed to carry out maintenance along a section or along the whole transmission line or when a fault occurs along this transmission line.

There may be one or more "T" junctions along the transmission line. Each "T" junction creates a three-section joint, wherein a first section and a second section allow the connection between the first electrical substation and the second electrical substation, and a third section allows an active or passive user, or a third electrical substation or primary substation, to connect to the HV transmission grid.

In the event of a permanent fault or maintenance along a section of the transmission line, after the transmission line has been disconnected by opening the circuit breakers arranged in the first and second electrical substations, as well as the circuit breakers present in any third section (active or passive user), the personnel in charge must go to one or more of said "T" junctions to work directly on the connections that ensure the continuity of the conductors at the tension clamps (jumpers) closest to said "T" junctions, or, on specific line disconnectors located before and after these "T" junctions, opening them, in order to isolate specific sections of the transmission line, on which to intervene for maintenance or to isolate and repair any faults.

Once the transmission line has been disconnected, it will therefore be possible to close the circuit-breakers related to the sections not affected by the fault or the sections not subject to maintenance, whether they are the line circuit-breakers of the first electrical substation, of the second or of the third section, in order to supply power to the transmission line again, except for the line sections that have been isolated by the operators by opening the jumpers or the line disconnectors.

This type of transmission line configuration has considerable disadvantages in terms of working times and time-periods wherein the transmission line remains cut-off, to the detriment of the users connected thereto.

In particular, in the event of a permanent fault, the transmission line will remain cut-off for the whole time the personnel takes to locate the faulty section of the line, reach the "T" junctions, usually tens of kilometers away from the operator's place of origin, and act on the jumpers or on the appropriate line disconnectors to isolate the desired line section. During this timeframe, the passive users connected to this line will no longer receive high-voltage electric power, and the active users will no longer be able to feed in the electric power produced, with consequent economic loss and possible potential damage to the plants, for specific manufacture processes.

In addition, in the event of an unplanned power interruption of the user, the transmission line operator will have to pay indemnities and penalties, increasing proportionally with the duration of the power interruption.

In the event of scheduled maintenance, the transmission line must be disconnected for the time required to open the jumpers or the disconnectors placed at the "T" junctions, resulting in the connected active and passive users being disconnected for these time-periods. In the case of passive users, such as steel mills or large industrial users, these interruptions require preliminary procedures to stop and make the plants safe, which may last hours, reducing or even interrupting the production capacity for the whole time required. It follows that these stops and, consequently, the maintenance interventions on the power lines, are usually allowed during periods of low production, such as Christmas and summer breaks only, with a consequent reduction in flexibility in the maintenance management of the electrical lines.

SUMMARY OF INVENTION

An object of this invention is thus to allow the reduction of working time and of the time-period wherein the transmission line remains cut-off, in the event of maintenance and or repair of any damage along said transmission line, in order to contain the amount of indemnities and penalties requested from the transmission grid operator and to avoid possible potential damages to the users' plants connected thereto, resulting from the prolongation of the power interruption.

A further object is to make the operation of the grid more flexible, by allowing to modify its topology, either by connecting or disconnecting individual sections or tap junctions of the high-voltage lines, with no need to disconnect the entire line and thus ensuring the users remain connected.

The aforesaid and other objects and advantages are achieved, according to an aspect of the present invention, by a high-voltage overhead electric transmission line as described and claimed herein. Preferred embodiments of the present invention are also described.

BRIEF DESCRIPTION OF THE DRAWINGS

The functional and structural features of some preferred embodiments of an overhead high-voltage electric transmission line according to the invention will now be described. Reference is made to the accompanying drawings, wherein.

DETAILED DESCRIPTION

Figure 1:
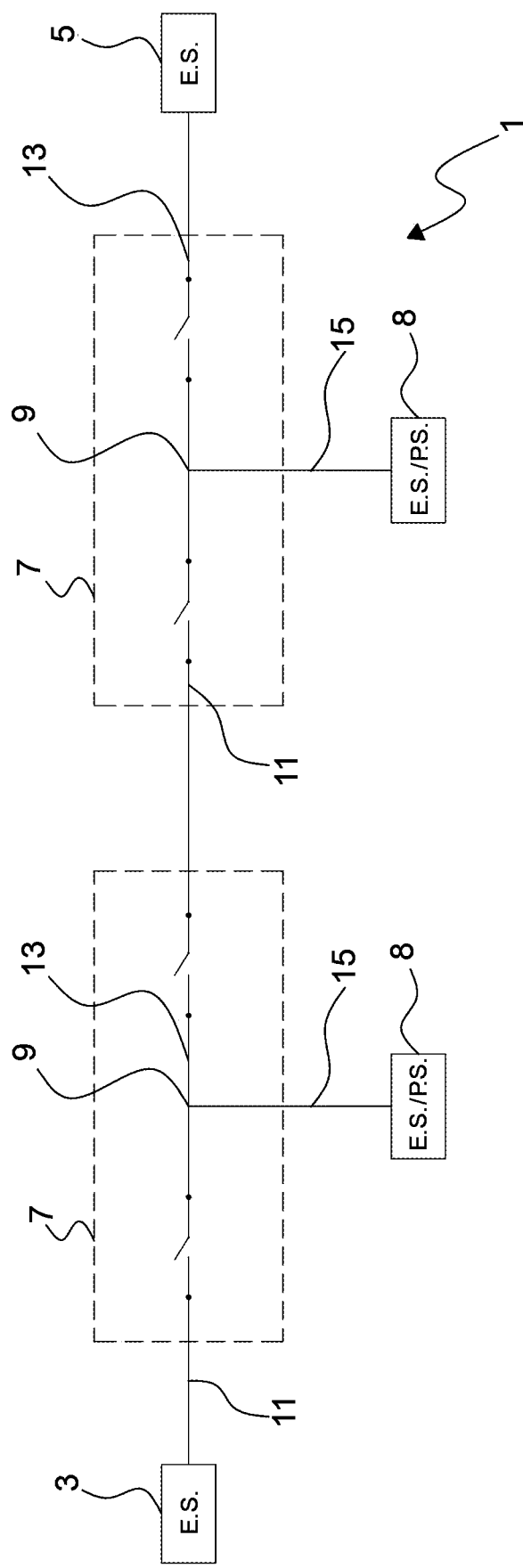
FIG. 1 shows a transmission line made according to the prior art, with "T" junctions at which line disconnectors are installed.

Before describing in detail a plurality of embodiments of the invention, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be intended as limiting of the protection required. The use of "include" and "comprise" and their variations are to be understood as encompassing the elements set out below and their equivalents, as well as additional elements and the equivalents thereof.

Figure 2:
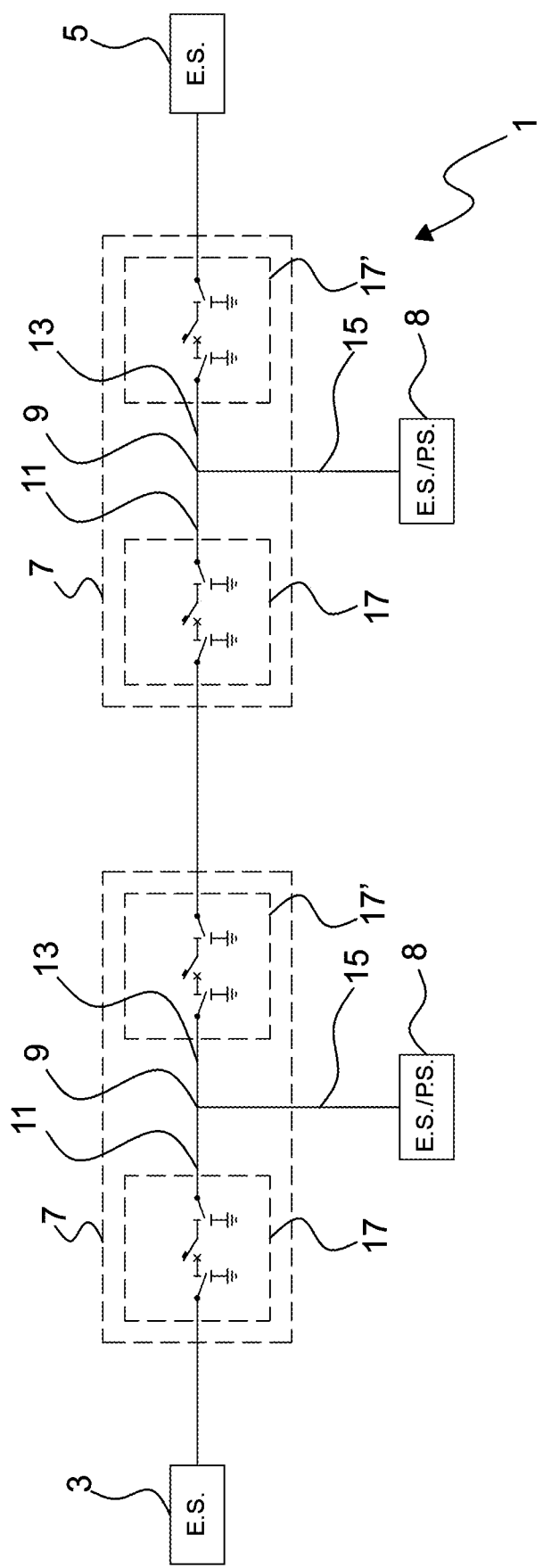
FIG. 2 shows a transmission line made according to this invention.
Figure 3:
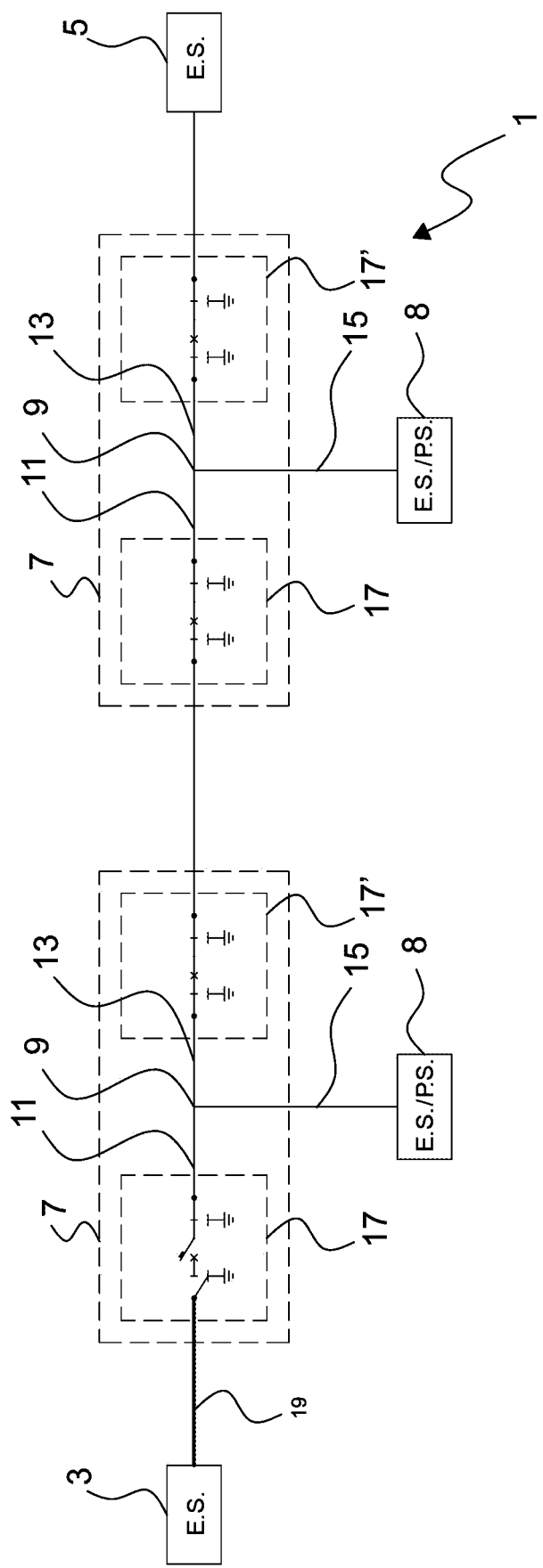
FIG. 3 shows an example of a configuration of the line according to the invention, in case an intervention is needed along a specified line section (section 19)

Referring initially to FIG. 2, a high-voltage overhead electric transmission line 1 is shown, extending from a first electrical substation 3 to a second electrical substation 5, according to the invention.

This high-voltage overhead electric transmission line 1 comprises at least one "T" junction 7 which forms a three-section joint 9.

A first section 11 and a second section 13 allow the connection between the first electrical substation 3 and the second electrical substation 5. A third section 15 allows the connection to the high-voltage overhead electric transmission line 1 of an active or passive user or of a third electrical substation or primary substation 8.

The "T" junction 7 comprises a first switchgear unit 17 which allows grid reconfigurations and is installed on the first section 11. The "T" junction 7 further comprises a second switchgear unit 17' which allows grid reconfigurations and is installed on the second section 13.

Each switchgear unit 17, 17' includes a plurality of switchgear unit poles 17A, 17B, 17C, each associated with a respective phase of the high-voltage overhead electric transmission line 1.

The so-called "switchgear unit pole" refers to a system composed of several electrical switchgear devices, immersed in an insulating fluid, and enclosed within metal casings.

The switchgear unit comprises the functions of circuit breaker, disconnector and, if necessary, ground disconnector in a single system.

The activation of the aforesaid functions is motorized, with the possibility of manual handling in the absence of power supply. The maneuvering of the electrical switchgear equipment allows the switchgear unit to interrupt the no-load, nominal and short-circuit currents of the transmission line on which it is used, to disconnect (electrically isolate) the circuits connected upstream and downstream of the contacts, ensuring the isolation distances, or to establish electrical continuity therebetween.

The switchgear unit is a system capable, therefore, of modifying the grid configuration, interrupting and re-establishing the electrical continuity in pre-established points of the High-Voltage grid, of extinguishing electrical faults and of carrying out safety measures by disconnecting and grounding system parts.

The switchgear unit is configured as a compact and multifunctional system of the modular type on which additional modules, such as protection and power transformers, may be installed to perform all the functions typically present in a bay of an electrical substation.

The switchgear units may be operated remotely, locally from a dedicated control panel or manually.

Each switchgear unit pole 17A, 17B, 17C of the switchgear units 17, 17' comprises a line circuit breaker and at least one line disconnector. Preferably, there are two line disconnectors, in particular, a first line disconnector 52' upstream of the circuit breaker 50 of the switchgear unit pole and a second line disconnector 52" downstream of said circuit breaker 50, each of which is adapted to switch between a continuity condition of the line and a disconnection condition thereof, with further possibility of ground connection.

The first switchgear unit 17 and the second switchgear unit 17' may be arranged at or near the three-section joint 9 of the "T" junction 7.

Figure 4:
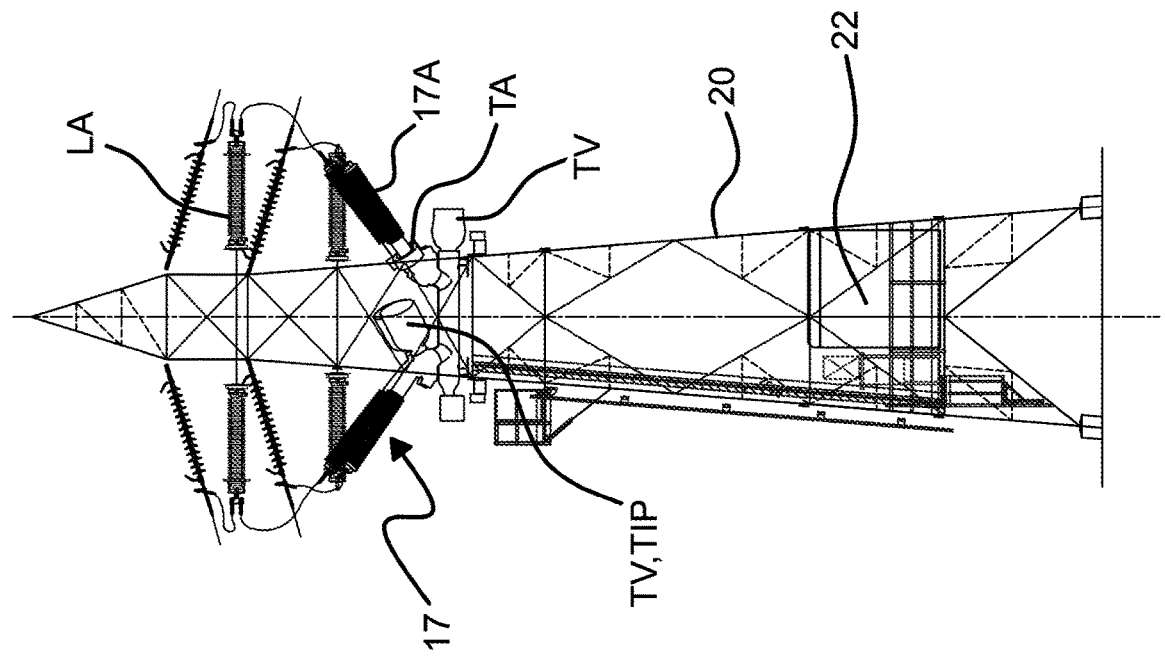
FIG. 4 shows a switchgear unit arranged on a lattice tower of the electric grid, together with the devices for protecting it from overvoltages (surge arresters)
Figure 4:
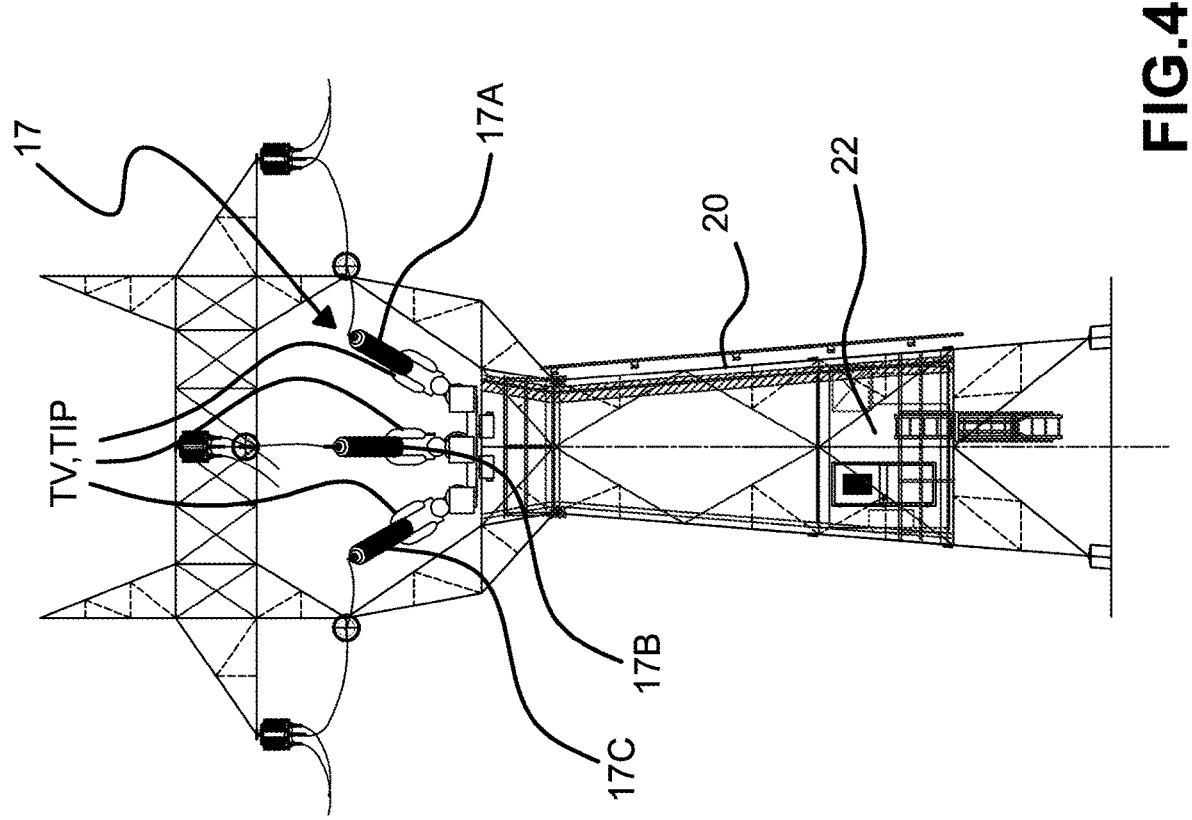

For example, the switchgear units 17, 17' could be installed on the ground near a tower of the electrical grid. However, this solution is expensive in terms of land consumption and, therefore, environmental sustainability. Preferably, as illustrated in FIG. 4, the first and second switchgear units 17, 17' are each installed on the respective tower (20) of the electrical grid, specifically designed for this purpose. By placing the switchgear units directly on a tower, a substantial reduction of land consumption is obtained, due to the use of the volume (space) already occupied by the structure of the lattice tower.

In a further aspect, the high-voltage overhead electric transmission line may include, for each switchgear unit 17, 17' installed, a protection, command and control system functional to the management thereof for the operation of the transmission line sections connecting the first electrical substation 3 and the second electrical substation 5, wherein operation of the transmission line sections refers to the opening/closing, disconnecting and grounding of the system. Said actions may result in the interruption of the no-load, nominal or fault current (typically, for example, following a phase-to-ground fault) of the line.

The protection, command and control system associated with each switchgear unit may also be installed directly on the tower 20 on which the respective switchgear unit 17, 17', controlled by said protection, command and control system, is installed, and it may be placed, in particular, inside a kiosk 22. The kiosk 22 will be enclosed in the volume (space) already occupied by the structure of the lattice tower. Preferably, the kiosk is raised off the ground for safety reasons.

In a further aspect, the operational status of the switchgear units 17, 17' may be teleoperated remotely, and more precisely, by the control room of the grid operator in charge of the territory, through suitable equipment, arranged in at least one of the first electrical substation 3 and the second electrical substation 5, arranged at the ends of the high-voltage overhead electric transmission line 1.

Figure 6:
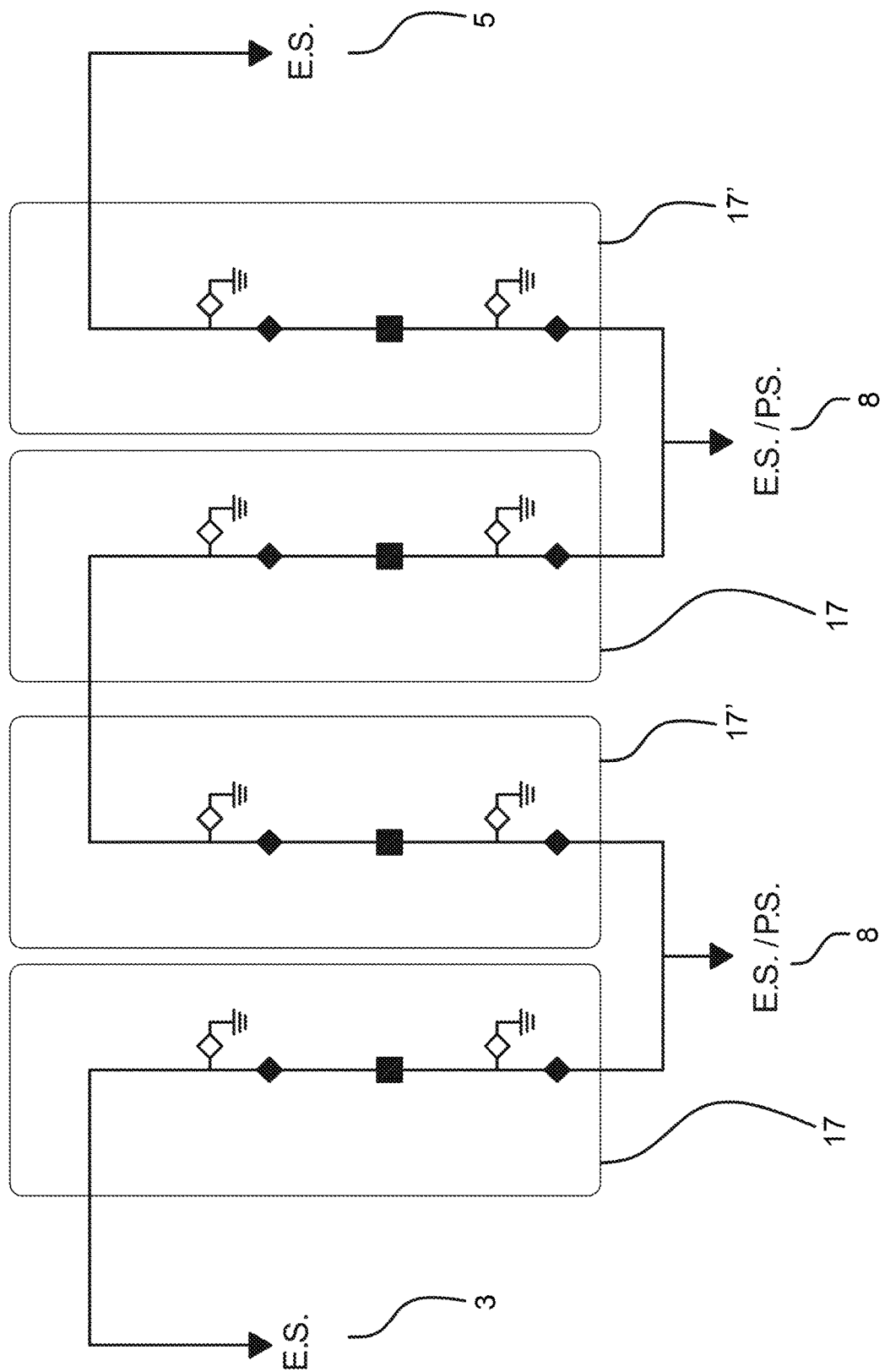
FIG. 6 shows an example of a remote control interface.
Figure 7:
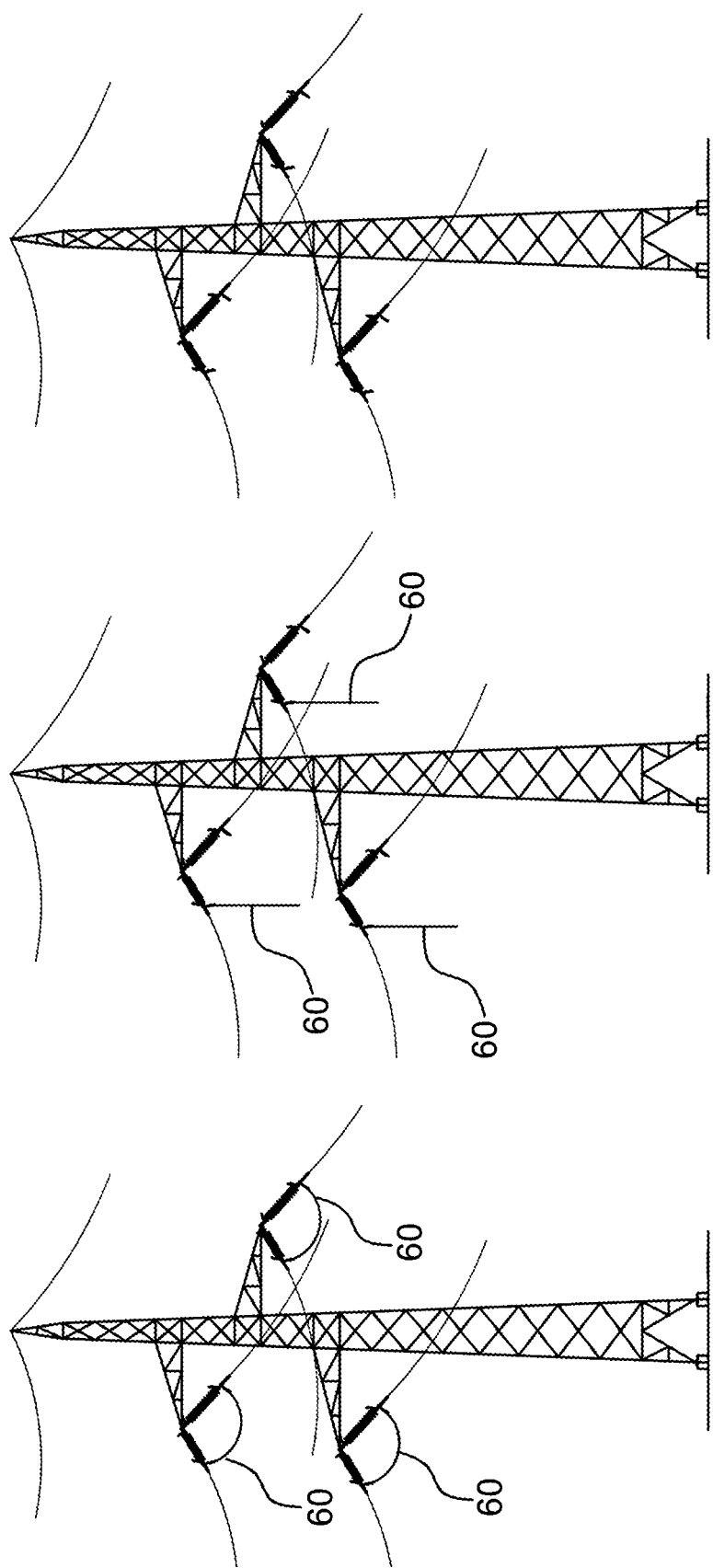
FIG. 7 shows the connections adapted to ensure the electrical continuity of the line on the tension clamps, called jumpers, and their opening, aimed at ensuring the disconnection of the line, in case line disconnectors are not installed.

An example of a graphic interface of a remote control system is schematically illustrated in FIG. 6. The entire transmission line is represented in this interface and, in particular, the various switchgear units, the electrical substations from which the line departs and the junctions to active or passive users, or to further electric substations or primary substations are depicted. Line circuit breakers are indicated with squares and disconnectors with rhombuses. The operator may determine the open/closed status of the circuit breakers and disconnectors based on the color assumed by the respective rhombus or square. By clicking on said rhombus or square, the operator may change its operational status.

The remote control systems may transmit to and receive signals from the protection, command and control system associated with each switchgear unit 17, 17' through respective optical fibers.

Figure 5:
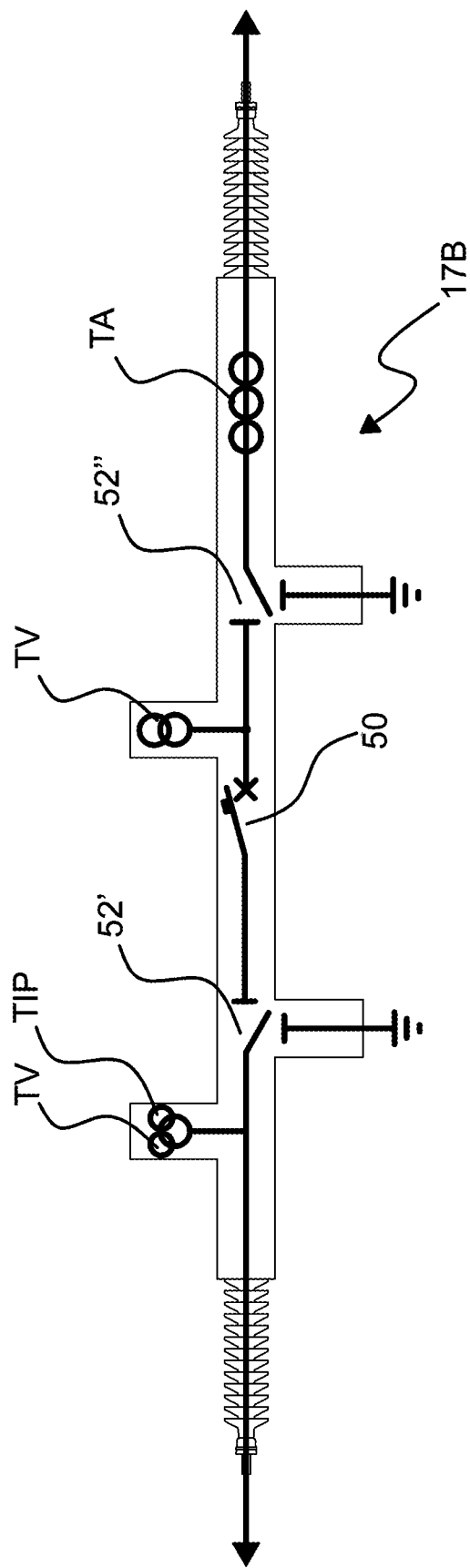
FIG. 5 shows the single-line diagram of a switchgear unit pole and the possible location thereon of inductive power transformers TIP, current transformers TA and voltage transformers TV.

As shown in FIGS. 4 and 5, each switchgear unit may comprise at least one current transformer TA, arranged for detecting the electric current of a phase of the high-voltage overhead electric transmission line 1, both in normal and fault conditions. These current detections are provided to allow monitoring of the line status and identification of the fault condition. Thus, it will then be possible to selectively extinguish said fault, by opening only the fault section without disconnecting the entire transmission line.

As shown in FIGS. 4 and 5, each switchgear unit 17, 17' may comprise a device arranged to draw electrical power supply directly from a phase of the high-voltage transmission line 1 in order to supply power to the protection, command and control system associated with the respective switchgear unit, as well as the electrical switchgear equipment, forming said switchgear unit. Said device may be mounted directly on at least one switchgear unit pole 17A, 17B, 17C of a switchgear unit 17, 17' and may be obtained by means of an inductive power transformer TIP.

As shown in FIGS. 4 and 5, each switchgear unit 17, 17' may also comprise a voltage transformer TV, arranged to detect the electric voltage of a phase of the high-voltage overhead electric transmission line 1, both in normal and fault conditions. Said electric voltage detections are provided to allow monitoring of the line status and identification of the fault condition. Thus, it will then be possible to selectively extinguish said fault, by opening only the fault section without disconnecting the entire transmission line.

This voltage transformer may be an independent module or may be integrated in the inductive power transformer TIP. The voltage transformers may also be more than one and may be installed upstream and downstream of the circuit breaker of a switchgear unit pole 17A, 17B, 17C, to enable an electrical synchronism check between the upstream and downstream line section of the switchgear unit 17, 17', preliminary to the correct closing operation of the circuit breaker 50 of each switchgear unit pole 17A, 17B, 17C.

As shown in FIG. 4, each switchgear unit may be protected from impulse overvoltages due to lightning strikes or operation of electrical devices, by surge arresters LA, installed upstream and downstream of the switchgear unit. Said surge arresters LA may also be installed on the tower 20 on which the switchgear unit 17, 17' is installed, for example in a horizontal position.

By means of this invention, it is possible to obtain the automatic detection and clearing of a faulty line section without disconnecting the entire line (and thus the users connected thereto). By means of this invention, it is possible to remotely and locally cut-off line sections for maintenance needs, without disconnecting the entire line and the users connected thereto and with no need to plan the power interruption with said users. By means of this invention, it is possible to remotely/locally modify the grid topology for online grid reconfigurations and greater flexibility in the operation thereof.

The advantage achieved is, therefore, that of having obtained a high-voltage overhead electric transmission line that reduces working time and the time-periods in which the transmission line remains disconnected in the event of maintenance and/or repair of any damage along said line, with a consequent reduction of indemnities and penalties requested from the transmission grid operator and reduction of the probability of damage to the users' plants resulting from the prolongation of the power interruption, during specific manufacture processes.

Different aspects and embodiments of a high-voltage overhead electric transmission line according to the invention have been described. It is understood that each embodiment may be combined with any other embodiment. Furthermore, the invention is not limited to the described embodiments, but may be varied within the scope defined by the appended claims.

The invention claimed is:

1. A high-voltage overhead electric transmission line, which extends from a first electrical substation to a second electrical substation, wherein the high-voltage overhead electric transmission line comprises at least one "T" junction that forms a three-section joint, wherein a first section and a second section are configured to allow electric connection between the first electrical substation and the second electrical substation, and a third section is configured to allow an electric connection between the high-voltage overhead electric transmission line and an entity selected from a group consisting of a user, a primary station, and a third electrical substation, wherein the at least one "T" junction comprises two switchgear units: a first switchgear unit configured to allow grid reconfigurations and installed on the first section, and a second switchgear unit configured to allow grid reconfigurations and installed on the second section;

each switchgear unit comprising a plurality of switchgear unit poles, each switchgear unit pole of said plurality of switchgear unit poles being associated with a respective phase of the high- voltage overhead electric transmission line; and each of said switchgear unit poles comprising a line circuit breaker and at least one line disconnector.

2. The high-voltage overhead electric transmission line of claim 1, wherein the first switchgear unit and the second switchgear unit are arranged at or near the three-section joint of the at least one "T" junction.

3. The high-voltage overhead electric transmission line of claim 1, wherein the first switchgear unit is installed on a first tower of the high-voltage overhead electric transmission line and the second switchgear unit is installed on a second tower of the high-voltage overhead electric transmission line.

4. The high-voltage overhead electric transmission line of claim 1, further comprising, for each installed switchgear unit, a protection, command and control system configured for managing said switchgear unit and for operating the sections of the high-voltage overhead electric transmission line connecting the first electrical substation and the second electrical substation.

5. The high-voltage overhead electric transmission line of claim 4, wherein each protection, command and control system associated with a respective switchgear unit is also installed directly on the tower on which the respective switchgear unit controlled by the protection, command and control system is installed.

6. The high-voltage overhead electric transmission line of claim 5, wherein the protection, command and control system associated with the respective switchgear unit is installed inside a respective kiosk.

7. The high-voltage overhead electric transmission line of claim 1, wherein an operating state of each switchgear unit is remotely teleoperated and telecontrolled by a control room of a system operator of a grid in charge of a territory, through a control equipment located in at least one of the first electrical substation and the second electrical substation.

8. The high-voltage overhead electric transmission line of claim 7, further comprising, for each installed switchgear unit, a protection, command and control system configured for managing said switchgear unit and for operating the sections of the high-voltage overhead electric transmission line connecting the first electrical substation and the second electrical substation, and wherein the control equipment located in at least one of the first electrical substation and the second electrical substation is configured to transmit and receive signals to/from each protection, command and control system associated with each switchgear unit through respective optical fibers.

9. The high-voltage overhead electric transmission line of claim 4, wherein each switchgear unit comprises at least one inductive power transformer configured to take electrical power directly from a phase of the high-voltage overhead electric transmission line to supply power to an electrical switchgear equipment of said switchgear unit and the protection, command and control system associated thereto.

10. The high-voltage overhead electric transmission line of claim 1, wherein the line disconnectors of each of said switchgear unit poles are two:
- a first line disconnector upstream of the line circuit breaker of a respective switchgear unit pole; and
- a second line disconnector downstream of the same line circuit breaker.

11. The high-voltage overhead electric transmission line of claim 1, wherein the at least one line disconnector is configured to switch to a line disconnection condition, with a further ground connection.

12. The high-voltage overhead electric transmission line of claim 1, wherein each switchgear unit further comprises at least one current transformer for detecting electric current of a phase of the high-voltage overhead electric transmission line, both in normal and fault conditions, the electric current detections allowing monitoring line status, identification of fault condition and location of the fault.

13. The high-voltage overhead electric transmission line of claim 1, wherein each switchgear unit further comprises at least one first voltage transformer for detecting electric voltage of a phase of the high-voltage overhead electric transmission line, both in normal and fault conditions, the electric voltage detections allowing monitoring line status, identification of fault condition and location of the fault.

14. The high-voltage overhead electric transmission line of claim 13, wherein each switchgear unit comprises at least one second voltage transformer associated with one of its switchgear unit poles;
- the at least one first voltage transformer being installed, with reference to the line circuit breaker of said switchgear unit pole, on one end of the switchgear unit pole with which said at least one first voltage transformer is associated, and the at least one second voltage transformer being installed on an opposite end of the switchgear unit pole with which the at least one first voltage transformer is associated;
- said at least one second voltage transformer being configured to enable an electric synchronism check, between a line section upstream and downstream the switchgear unit, prior to correct closing operation of the line circuit breaker of each switchgear unit pole.

15. The high-voltage overhead electric transmission line of claim 14, wherein each switchgear unit comprises at least one inductive power transformer configured to take electrical power directly from a phase of the high-voltage overhead electric transmission line to supply power to an electrical equipment of said switchgear unit and the protection, command and control system associated thereto, and wherein at least one of the first and second voltage transformers is incorporated in the inductive power transformer.

16. The high-voltage overhead electric transmission line of claim 3, wherein each switchgear unit is protected against overvoltages by installing, upstream and downstream thereof, surge arresters on same tower on which the switchgear unit is installed.

17. The high-voltage overhead electric transmission line of claim 13, wherein each switchgear unit comprises at least one inductive power transformer configured to take electrical power directly from a phase of the high-voltage overhead electric transmission line to supply power to an electrical equipment of said switchgear unit and the protection, command and control system associated thereto, and wherein the first voltage transformer is incorporated in the inductive power transformer.

* * * * *